(12) United States Patent
Suzuki et al.

(10) Patent No.: US 7,873,137 B2
(45) Date of Patent: Jan. 18, 2011

(54) REACTIVITY CONTROL ARRANGEMENT AND FAST REACTOR

(75) Inventors: Toshiyuki Suzuki, Tokyo (JP); Koji Matsumoto, Kanagawa (JP); Kenzo Koizumi, Kanagawa (JP); Yasushi Tsuboi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 853 days.

(21) Appl. No.: 11/672,782

(22) Filed: Feb. 8, 2007

(65) Prior Publication Data
US 2009/0175403 A1 Jul. 9, 2009

(30) Foreign Application Priority Data
Feb. 9, 2006 (JP) ............................. 2006-032308

(51) Int. Cl.
G21C 7/00 (2006.01)
G21C 19/00 (2006.01)

(52) U.S. Cl. ................ 376/327; 376/332; 376/334; 376/261; 376/262

(58) Field of Classification Search ............ 376/327, 376/332, 334, 261, 262
See application file for complete search history.

(56) References Cited

U.S. PATENT DOCUMENTS

| 4,045,283 | A | * | 8/1977 | Noyes et al. | 376/239 |
| 2005/0220251 | A1 | * | 10/2005 | Yokoyama et al. | 376/220 |

FOREIGN PATENT DOCUMENTS

JP          02002987 A  *  1/1990

* cited by examiner

Primary Examiner—Rick Palabrica
Assistant Examiner—Erin M Boyd
(74) Attorney, Agent, or Firm—Oblon, Spivak, McClelland, Maier & Neustadt, L.L.P (57) ABSTRACT

A fast reactor including a reactivity control assembly including a reactor shutdown rod and neutron absorbers, a reactor shutdown rod drive mechanism, and units of neutron absorber drive mechanism. The reactor shutdown rod drive mechanism causes an inner extension tube to fall and release the reactor shutdown rod by a gripper section by turning off the power supply to a holding magnet at the time of scram. When grasping the neutron absorbers, an outer extension shaft is pulled up to allow both of the extension shafts to be inserted. After the outer extension tube gets to a handling head section of the neutron absorber, the outer extension shaft is pushed down to grasp the neutron absorber externally by latch fingers of the gripper section so that the neutron absorber can be moved up and down.

15 Claims, 10 Drawing Sheets

REACTIVITY CONTROL ARRANGEMENT AND FAST REACTOR

CROSS REFERENCE TO RELATED APPLICATION

This application is based upon and claims the benefit of priority from the prior Japanese Patent Application No. 2006-32308, filed on Feb. 9, 2006, the entire contents of which are incorporated herein by reference.

BACKGROUND OF THE INVENTION

The present invention relates to a reactivity control arrangement and a fast reactor utilizing the same.

Figure 10:
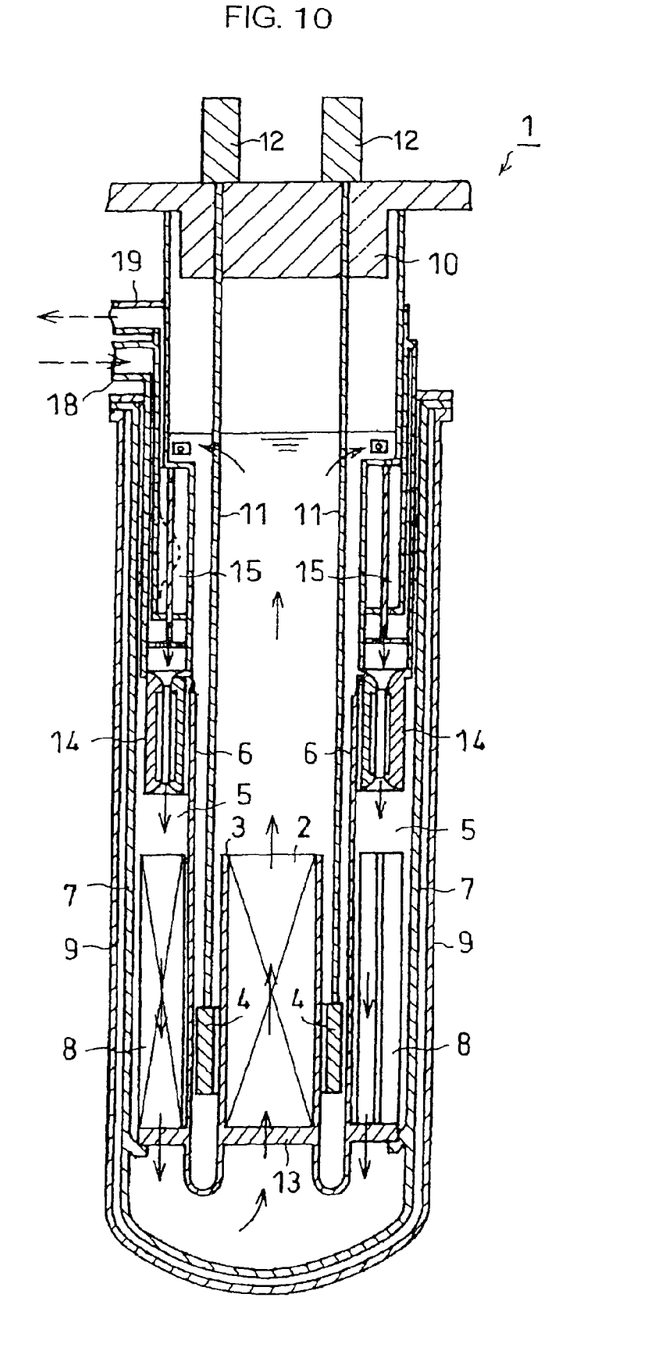
FIG. 10 is a schematic longitudinal cross sectional view of a known fast reactor.

Japanese Patent No. 3126524 (Patent Document 1) discloses a known fast reactor (entire contents of which are incorporated herein by reference). Referring to FIG. 10 of the accompanying drawings, the known fast reactor comprises a reactor core 2 that has nuclear fuel assemblies. The reactor core 2 shows a substantially cylindrical profile and a core barrel 3 is arranged around the outer periphery of the reactor core 2 in order to protect the reactor core 2. A circular-shaped annular reflector 4 is so provided around the core barrel 3 as to surround the core barrel 3. A bulkhead 6 is arranged at the outside of the reflector 4 to surround the reflector 4 and constitutes the inner wall of a coolant flow channel for primary coolant. A reactor vessel 7 that functions as the outer wall of the coolant flow channel is arranged at the outside of the bulkhead 6 with a gap interposed between them. A neutron shield 8 is arranged in the coolant flow channel to surround the reactor core 2.

A hexagonal barrel-shaped wrapper tube is arranged at the center of the reactor core and a cylindrical reactor shutdown rod and six sectorial neutron absorbers are contained in the wrapper tube, the neutron absorbers surrounding the shutdown rod. The reactor shutdown rod operates as backup reactor shutdown system for the reflector that functions as main reactor shutdown member, whereas the neutron absorbers suppress the reactivity when the initial surplus reactivity is high. Of the drive system, the reactor shutdown rod drive mechanism comprises a drive section and an upper guide tube and links to the reactor shutdown rod arranged below the upper guide tube. It has an up and down drive function in normal operation, a scram function in emergency and a reactor shutdown rod releasing/grasping function before the re-start-up. The neutron absorber drive mechanism includes an operation shaft and a hold mechanism, and is adapted to grasp the neutral absorbers only once during the service life of the plant and pull up and hold them individually.

A fast reactor controlled by means of the reflector requires a reactor shutdown rod drive mechanism of the backup reactor shutdown system and a neutron absorber drive mechanism for suppressing an initial surplus reactivity. However, a reflector drive mechanism, an intra-reactor liquid level meter, an intra-reactor thermometer and other instruments are mounted in an upper part of a nuclear reactor, and hence such drive mechanisms need to be installed in a limited space.

Additionally, a fast reactor controlled by means of a reflector can be driven to operate continuously for a long period of time so that the servicing operation needs to be minimized for standing activation devices and the fast reactor requires backup activation mechanisms for unexpected troubles. Particularly, it is desirable that the reactor shutdown rod drive mechanism is equipped with a back up scram mechanism from the viewpoint of safety.

On the other hand, the neutron absorber drive mechanism needs to be arranged adjacent to the reactor shutdown rod so that it is indispensably required to be structurally compact.

SUMMARY OF THE INVENTION

An object of the present invention is to provide a high performance reactivity control arrangement that suppresses the reactivity when the initial surplus reactivity is high, is compact and highly reliable and can realize a multiplexed reactor shutdown rod scram function by mean of simple and compact mechanisms.

According to an aspect of the present invention, there is provided a fast reactor that comprises: a plurality of fuel assemblies forming a reactor core; a reactivity control assembly including the reactor shutdown rod of a backup reactor shutdown system and neutron absorbers disposed around the reactor shutdown rod to suppress initial surplus reactivity, the reactor shutdown rod and the neutron absorbers being arranged in a hexagonal barrel-shaped wrapper tube at the center of the reactor core; a core barrel surrounding outer periphery of the reactor core; a reflector surrounding the outer periphery of the core barrel and adapted to move up and down; a bulkhead surrounding outer periphery of the reflector and forming an inner wall of a coolant flow channel of primary coolant; an upper support plate supporting the core barrel and the bulkhead; an intermediate heat exchanger arranged in an annular space above the upper support plate; an electromagnetic pump arranged below an intermediate heat exchanger; a reactor vessel containing the fuel assemblies, the reactivity control assembly, the reflector, the bulkhead, the intermediate heat exchanger and the electromagnetic pump and having an upper opening; an upper plug plugging the upper opening of the reactor vessel; a reactor shutdown rod drive mechanism for causing an inner extension tube to fall and releasing a reactor shutdown rod by means of a gripper section at a lowermost end of an outer extension tube by turning off power supply to a holding magnet at a time of scram; and a plurality of units of neutron absorber drive mechanism, each having a dual tube type drive shaft including an outer extension shaft and an inner extension shaft, the outer extension shaft being adapted to be pulled up to allow both of the inner and outer extension shafts to be inserted and pushed down after getting to a handling head section of the neutron absorber so as to grasp the neutron absorber externally by means of latch fingers of gripper section thereof and hang up entirely with the drive shaft in order to individually move the neutron absorber up and down, wherein the reactor shutdown rod drive mechanism and the neutron absorber drive mechanism are integrally formed and arranged at center of the upper plug.

According to another aspect of the present invention, there is provided a reactivity control arrangement comprising a reactivity control assembly arranged at a center of a reactor core having a plurality of fuel assemblies, wherein the reactivity control assembly has: a hexagonal barrel-shaped wrapper tube; a reactor shutdown rod of a backup reactor shutdown system arranged in the wrapper tube so as to be vertically movable; and a plurality of neutron absorbers arranged around the reactor shutdown rod in the wrapper tube so as to be individually vertically movable and adapted to suppress initial surplus reactivity.

DETAILED DESCRIPTION OF THE INVENTION

Now, preferred embodiments of the present invention will be described in greater detail by referring to FIGS. 1 through 9 of the accompanying drawings. The components same as or similar to those of the known fast reactor shown in FIG. 10 are denoted respectively by the same reference symbols and will not be described repeatedly.

First Embodiment

Figure 1:
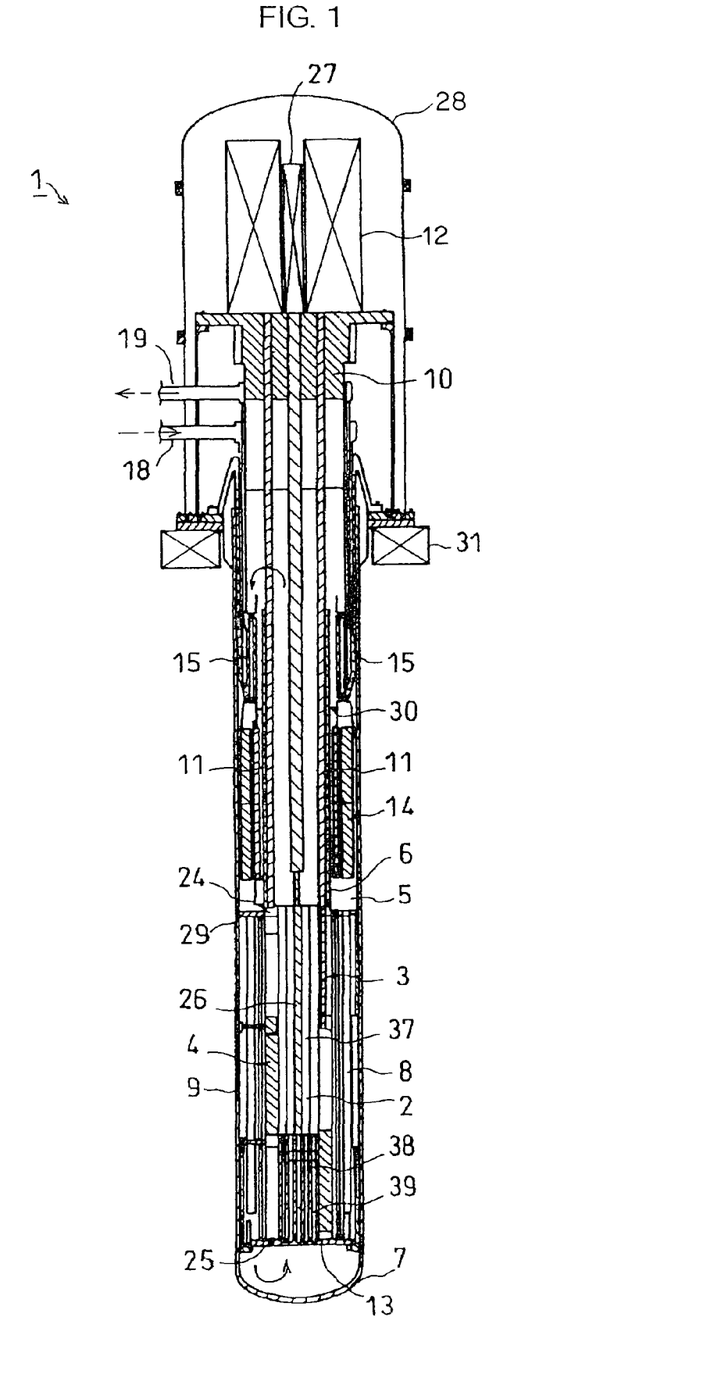
FIG. 1 is a schematic longitudinal cross sectional view of a first embodiment of fast reactor according to the present invention.
Figure 2A:
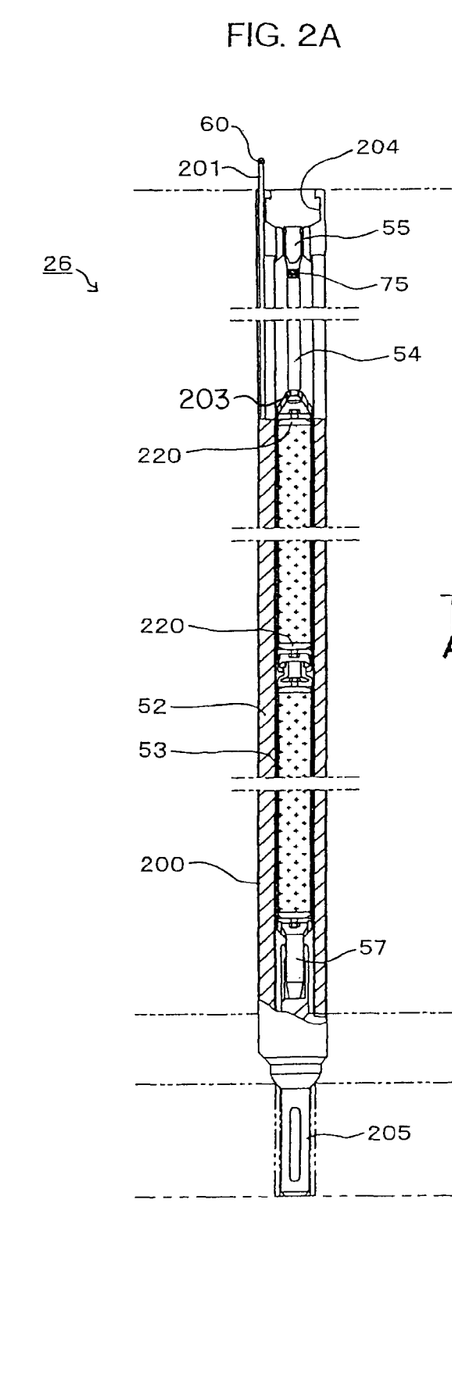
FIG. 2A is a schematic lateral cross sectional view of a reactor shutdown rod of FIG. 1 taken along line A-A in FIG. 2B.
Figure 2B:
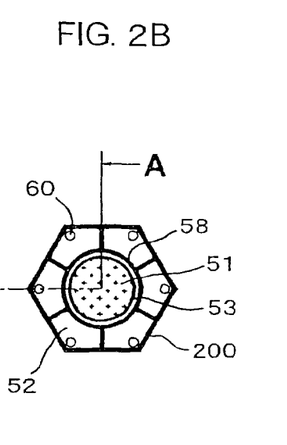
FIG. 2B is a schematic transversal cross sectional view of the reactor shutdown rod of FIG. 2A.
Figure 3:
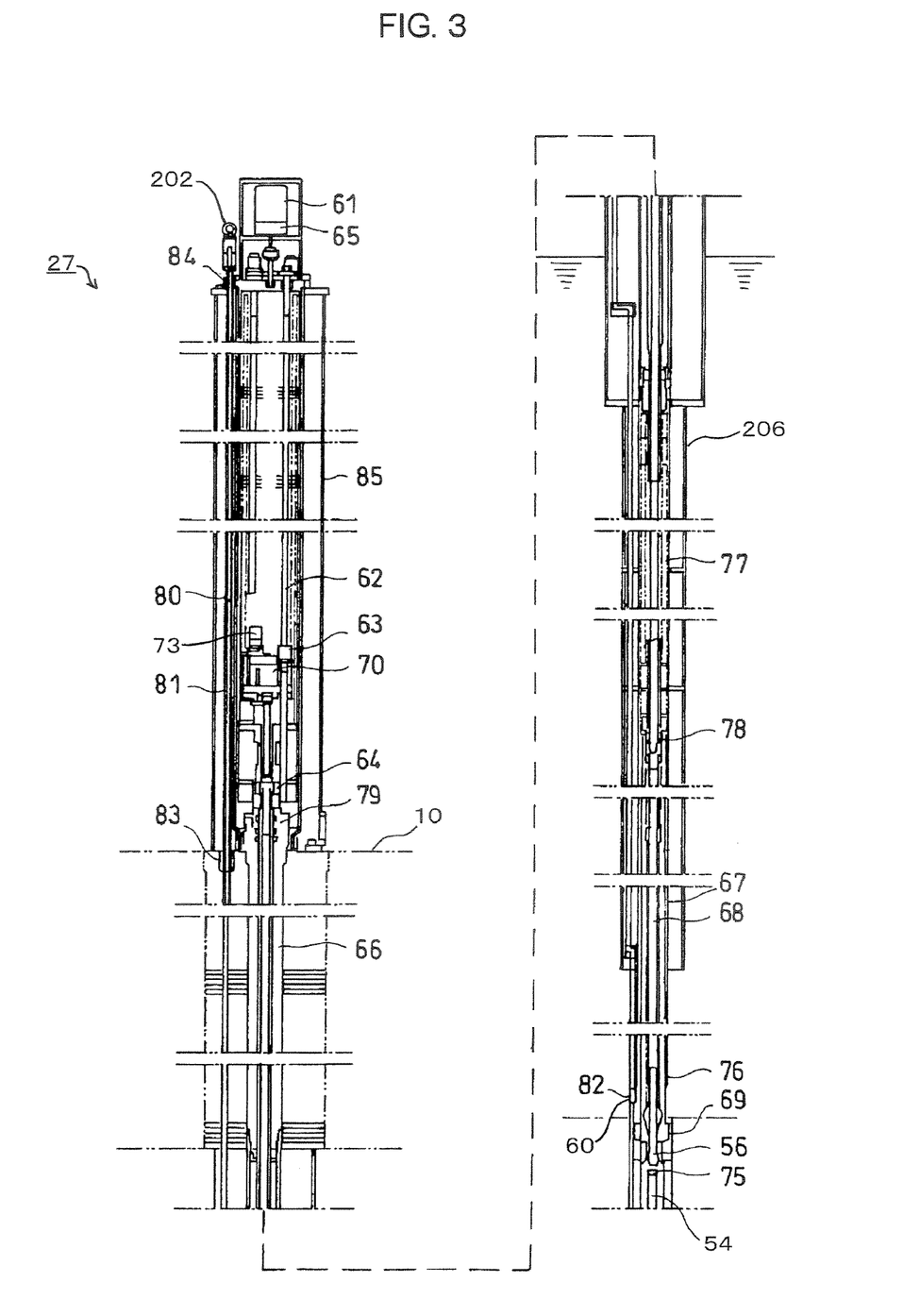
FIG. 3 is an enlarged schematic longitudinal cross sectional view of a reactor shutdown rod drive mechanism of FIG. 1.

FIG. 1 is a schematic longitudinal cross sectional view of the first embodiment of fast reactor according to the present invention. FIGS. 2A and 2B schematically illustrate the configuration of the reactor shutdown rod in FIG. 1. FIG. 2A is a schematic lateral cross sectional view of the reactor shutdown rod taken along line A-A in FIG. 2B. FIG. 2B is a schematic transversal cross-sectional view thereof. FIG. 3 is an enlarged schematic longitudinal cross sectional view of the reactor shutdown rod drive mechanism of FIG. 1.

As shown in FIG. 1, the fast reactor 1 of this embodiment comprises as main component thereof a reactor core 2, a reactor core barrel 3, a plurality of reflectors 4, a bulkhead 6, a neutron shield 8, a reactor vessel 7, a plurality of fuel assemblies 37, an entrance module 38, a reactor core support plate 13, an upper support plate 29, an intermediate heat exchanger 15, an electromagnetic pump 14, a reactivity control assembly 26, an upper plug 10, a guard vessel 9 and a containment dome 28.

The fuel assemblies 37 are fitted one by one to the entrance module 38. The entrance module 38 is by turn fitted to a reactor core support table 39. The reactor core support table 39 is fitted to the top surface of the reactor core support plate 13. The reactor core support plate 13 is by turn fitted to the reactor vessel 7.

The primary coolant 5 may typically be liquid metal sodium that circulates in the reactor vessel 7. The primary coolant 5 is fed downward by means of the electromagnetic pump 14 arranged in an annular section arranged outside the bulkhead 6 in the reactor vessel 7. Then, primary coolant 5 moves up from the bottom of the reactor vessel 7 to go into the inside of the bulkhead 6 and is heated as it passes through the reactor core 2. Thereafter, it moves up further and then falls through the annular section arranged outside the bulkhead 6 to give heat to secondary coolant in the intermediate heat exchanger 15 before it returns to the electromagnetic pump 14.

The secondary coolant may typically be liquid metal sodium that flows into the reactor vessel 7 by way of an entrance nozzle 18 and heated in the intermediate heat exchanger 15 before it flows out of the reactor vessel 7 by way of an exit nozzle 19. After going out from the exit nozzle 19, the secondary coolant may be used as heat source for a steam generator or the like (not shown).

As shown in FIGS. 2A and 2B, the reactivity control assembly 26 at the center of the reactor core 2 has a hexagonal barrel-shaped wrapper tube 200, a cylindrical reactor shutdown rod 51 arranged in the wrapper tube 200 and six sectorial neutron absorbers 52 arranged around the reactor shutdown rod 51. The control element of the reactor shutdown rod 51 is hafnium in the form of a cylinder that is hermetically sealed in a stainless steel tube. The control element is sandwiched between upper and lower lattice plates 220 and rigidly secured in position with a protection tube 53 to form the reactor shutdown rod 51. The reactor shutdown rod 51 itself is of a division type including upper and lower members and including a head 203 formed at the top of the rod 51.

The reactivity control arrangement includes as principal components thereof the hexagonal barrel-shaped wrapper tube 200 at the center of the reactor core 2, the reactor shutdown rod 51 of the backup reactor shutdown system arranged in the wrapper tube 200, and the reactivity control assembly 26 containing the neutron absorbers 52 arranged around the reactor shutdown rod 51 to suppress the initial surplus reactivity. The reactor shutdown rod 51 by turn includes a handling rod 54 arranged above the protection tube 53 and a handling head 55 arranged at the top of the handling rod 54, and is adapted to be coupled with a gripper 56 arranged at the lower end of outer extension tube 67 of the reactor shutdown rod drive mechanism. It is pulled out of or inserted into the fast reactor by means of a mechanism, which will be described in greater detail hereinafter, when the fast reactor is started or shut down, whichever appropriate, in order to control the reactivity. It also has a scram function of quickly shutting down the reactor by adding a negative reactivity to the reactor when it is inserted into the reactor in emergency.

The handling rod 54 and the top part of the protection tube 53 are coupled to each other by means of a joint 103. Along with the division type structure, this structure can absorb the resistance against the insertion when an earthquake takes place as it is bent and displaced at the joint section so that the reactor shutdown rod can be inserted smoothly. A dash ram 57 is arranged below the reactor shutdown rod 51 as a buffer against a fall in a scram.

The reactivity control assembly 26 substantially has a hexagonal barrel-shaped profile all the way from the guide tube handling head 204 arranged at the top end down to the entrance nozzle 205 arranged at the bottom end by way of the wrapper tube 200 with a cylindrical lower guide tube 58 arranged at the middle to guide the up and down movement of the reactor shutdown rod 51. The six sectorial neutron absorbers 52 are contained between the lower guide tube 58 and the wrapper tube 200. The neutron absorbers 52 are made of hafnium and covered as a whole by stainless steel along the outer surfaces thereof. Unlike the reactor shutdown rod 51, the neutron absorbers 52 do not have the scram function and are normally rigidly secured in position for a long period of about 15 years from the initial stages of operation of the fast reactor in order to absorb the relatively large initial surplus reactivity in the reactor core. It will be drawn up from the reactor core by means of a mechanism, which will be described in detail hereinafter, when the surplus reactivity falls after the above-cited period.

A cylindrical handling rod 201 is fitted to the top ends of the neutron absorbers 52 and the top end of the handling rod 201 slightly projects from the top of the reactivity control assembly 26. A handling head 60 is arranged at the front end of the handling rod 201 so that it can be gripped by a gripper from outside. While the above reactivity control arrangement is described in terms of a case where it is applied to a fast reactor, the present invention is by no means limited thereto and the reactivity control arrangement can be applied to any other nuclear reactors for reactivity control.

The reactor shutdown rod drive mechanism includes a drive section 12 and an upper guide tube 66. The drive section is installed so as to stand by itself on the top surface of the upper plug 10. The upper guide tube 66 is installed in a posture adapted to be inserted into the reactor from the opening of the reactor upper plug 10. The reactor shutdown rod drive mechanism employs a motor-driven ball screw system that provides a high alignment precision and is diametrically compact. A motor 61 drives a twin ball screw 62 to move a latch mechanism 64 up and down. The latch mechanism 64 grasps and releases the extension tubes 67, 68 by means of a ball nut 63.

The ball screw 62 is of the twin ball screw type in order to avoid the extension tube latch mechanism 64 located at the center. A cyclo-reduction gear 65 is arranged between the motor 61 and the ball screw 62 so that the extension tubes 67, 68 may not fall down if the electromagnetic brake comes in trouble while the reactor shutdown rod 51 is pulling up the extension tubes 67, 68 in a de-latched state for an operation of replacing the fuel assemblies 37.

The up and down drive force of the drive section is transmitted to the reactor shutdown rod 51 by way of the extension tubes 67, 68 in the inside of the upper guide tube 66. The extension tubes are a dual tube having an outer extension tube 67 and an inner extension tube 68. The reactor shutdown rod 51 is grasped (latched) when the holder magnet 70 in the inside of the drive section is magnetically excited in a state that the gripper 56 is inserted in the reactor shutdown rod handling head 55 and the latch finger 71 is opened. Then, the inner extension tube 68 and the outer extension tube 67 are simultaneously pulled up.

At the time the reactor shutdown rod 51 is released (delatched), the holder magnet 70 in the inside of the drive section is magnetically de-excited and only the outer extension tube 67 is pulled up. Then, as a result, the outer extension tube 67 moves to above the inner extension tube 68 and the latch finger 71 of the gripper 56 is closed so that the reactor shutdown rod handling head 55 is de-latched.

Figure 4A:
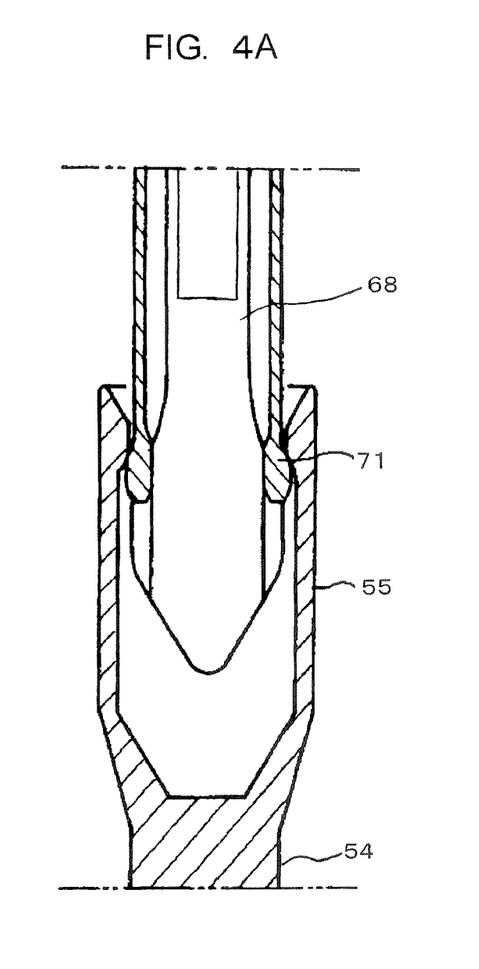
FIG. 4A is a schematic illustration of the operation of a reactor shutdown rod grasping section of the fast reactor of FIG. 1 in a state of being connected to the reactor shutdown rod.
Figure 4B:
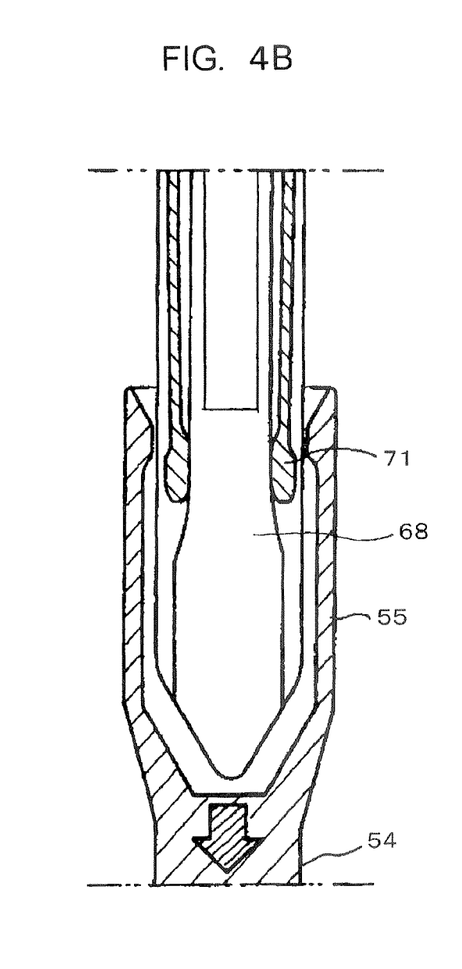
FIG. 4B is a schematic illustration of the operation of the reactor shutdown rod grasping section of FIG. 4A in a state of being released from the reactor shutdown rod.

Now, the scram of the reactor shutdown rod drive mechanism will be described by referring to FIGS. 4A, 4B and 5.

The scram system is of a release/freefall type for the reactor shutdown rod 51 and the extension tubes 67, 68, and the outer extension tube 67 releases the reactor shutdown rod 51 at the lower end gripper 56. From the failsafe viewpoint, the latch link 205 is opened to release the inner extension tube 68 when the holder magnet 70 is magnetically de-excited in the drive mechanism. In the scram, the power supply to the holder magnet 70 is turned off so that the inner extension tube 68 falls slightly and the latch finger 71 that is grasping the reactor shutdown rod handling head 55 is closed. Consequently, the reactor shutdown rod 51 starts freefall.

In view of a risk that the armature 72 does not fall for some reason or another so that the inner extension tube 68 does not fall either, a backup scram mechanism is provided to push down the rod 74 by means of a backup de-latching drive motor 73 and produce a gap between the holder magnet 70 and the armature 72 in order to put the attraction of the holder magnet 70 out of balance and release them. The control circuit of the backup scram mechanism may be provided with a timer so that the backup scram mechanism will be actuated with a slight time lag after the ordinary scram operation of turning off the holder magnet 70. Then, the backup scram mechanism may be referred to as a second scram mechanism.

A permanent magnet 75 is buried in the reactor shutdown rod handling head 55 and a coil 76 is fitted to the upper guide tube 66 in order to detect the position of the reactor shutdown rod 51 in the case of scram. The electric current produced when the permanent magnet 75 passes the coil 76 is observed to detect the position of the reactor shutdown rod 51 in the case of scram.

The upper guide tube 66 of the reactor shutdown rod drive mechanism rigidly holds one of the opposite ends of the bellows 77 that operates as cover gas seal, while the other end of the bellows 77 is rigidly secured to the outer extension tube 67. A latch bellows 78 is arranged between the outer extension tube 67 and the inner extension tube 68 to provide a sealing effect. A backup seal 79 that is a double V-packing is arranged in the inside of the drive mechanism in view of breakdown, although the probability of occurrence of such a trouble is very low. The upper guide tube 66 is arranged in a CRD guide tube 206. The lower end of the upper guide tube 66 is pushed into the inside of the reactor shutdown rod handling head 69 for the purpose of alignment, holding and anti-seismic shakes.

Next, the neutron absorber drive mechanism will be described with reference to FIG. 3.

A total of six units of neutron absorber drive mechanism are arranged around and near the reactor shutdown rod drive mechanism at regular intervals in order to pull up the six neutron absorbers 52 individually. The neutron absorber drive mechanism is operated manually on the site. The drive shaft of each of the units has a dual tube structure of an inner extension shaft 80 and an outer extension shaft 81 that are offset from each other midway. When grasping a neutron absorber 52, the corresponding extension shafts 80 is pulled up by about 50 mm and the two extension shafts 80, 81 are inserted into the neutron absorber handling head 60 and handling head 60 of the neutron absorber 52 is grasped by the latch finger (not shown) of the gripper section by means of the drive shaft latch mechanism 82. Subsequently, only the outer extension shaft 81 is lowered to rigidly secure the latch finger of the gripper section.

For the operation of pulling up a neutron absorber 527 the drive shaft supporting stopper 84 arranged around the drive motor is taken off in a condition where the cover gas seal section 83 of a double V packing is held and an eyebolt 202 is hung up. It is conceivable that the sodium adhering to the shaft in the space of cover gas then adheres to the seal to become no longer capable of maintaining its sealing effect as the drive shaft is pulled up in the cover gas seal section 83 arranged on the top surface of the upper plug 10. In view of this possible problem, an entire outer housing 85 of the drive section is made to operate as seal structure and a backup seal 79 is arranged in an upper part.

In FIG. 1, reference symbol 11 denotes a reflector drive shaft that drives the reflector 4 to move up and down. Reference symbol 24 denotes a rib, reference symbol 25 denotes a base, and reference symbols 30 and 31 respectively denote a partition plate and a table.

As described above, with the first embodiment of the present invention, it is possible for the reactor shutdown rod drive mechanism to realize a highly reliable drive system and a multiplexed scram function with a simple configuration. Additionally, the drive mechanisms of the neutron absorbers 52 can be realized as simple mechanisms that can be arranged densely in a narrow space found around the reactor shutdown rod drive mechanism so as to be combined with the reactor shutdown rod drive mechanism to form a compact structure.

Second Embodiment

Figure 6:
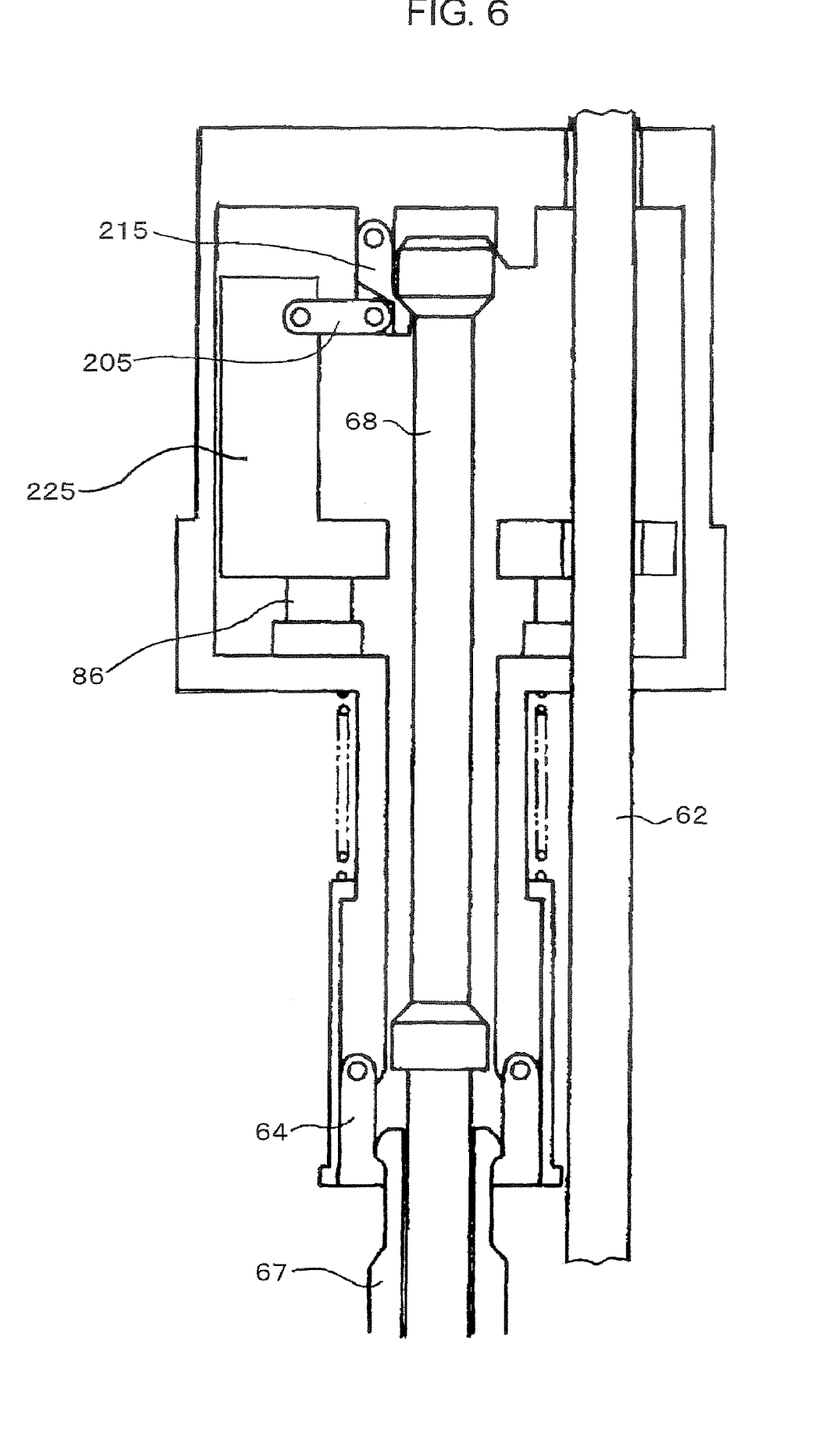
FIG. 6 is a schematic illustration of the reactor shutdown de-latching mechanism of a second embodiment of fast reactor of the present invention, showing the configuration thereof.

Now, the second embodiment of the present invention will be described below by referring to FIG. 6. The components of the second embodiment that are the same or similar to those of the first embodiment are denoted respectively by the same reference symbols and will not be described in detail any further.

Figure 5:
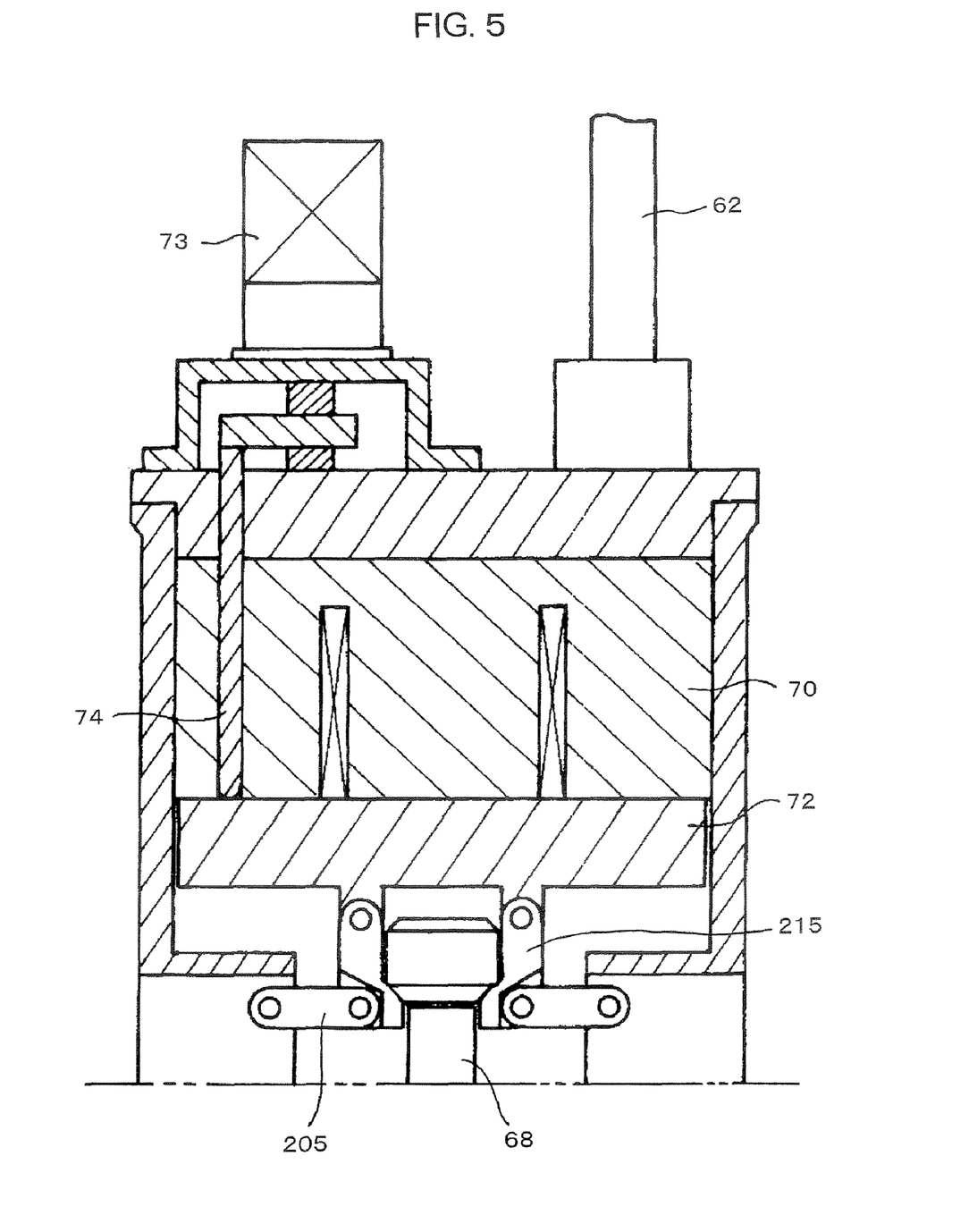
FIG. 5 is a schematic illustration of a reactor shutdown rod de-latching mechanism of FIG. 1, showing the configuration thereof.

A backup scram mechanism is provided to push down the rod 74 and release the pushdown armature 72 by means of a backup de-latching driving motor 73 of the reactor shutdown rod drive mechanism as shown in FIG. 5. On the other hand, in the second embodiment, the outer extension tube 67 is forcibly pushed up by a small stroke to close the latch finger 71 that has been grasping the reactor shutdown rod handling head 55 so as to allow the reactor shutdown rod 51 to make a freefall as shown in FIG. 6.

With the backup scram mechanism, the power cylinder 86 arranged at the extension tube latch mechanism 64 that is hanging up an upper part of the outer extension tube 67 pushes up the link mechanism of the outer extension tube upper part 225 to drive the top part of the inner extension tube 68 to move upward. Then, the links 205 of the latch mechanism become inclined to open the latch links 215 of the inner extension tube. As a result, the inner extension tube 68 makes a freefall to close the latch fingers 71 that have been grasping the reactor shutdown rod handling head 55 and allow the reactor shutdown rod 51 to make a freefall. While the power cylinder 86 is provided here as push up mechanism, it may be replaced by a hydraulic jack.

With the above-described second embodiment of the present invention, it is possible for the reactor shutdown rod drive mechanism to realize a highly reliable drive system and a multiplexed scram function with a simple configuration.

Third Embodiment

Now, the third embodiment of the present invention will be described below by referring to FIG. 7. The components of the third embodiment that are the same or similar to those of the first embodiment are denoted respectively by the same reference symbols and will not be described in detail any further.

Figure 7:
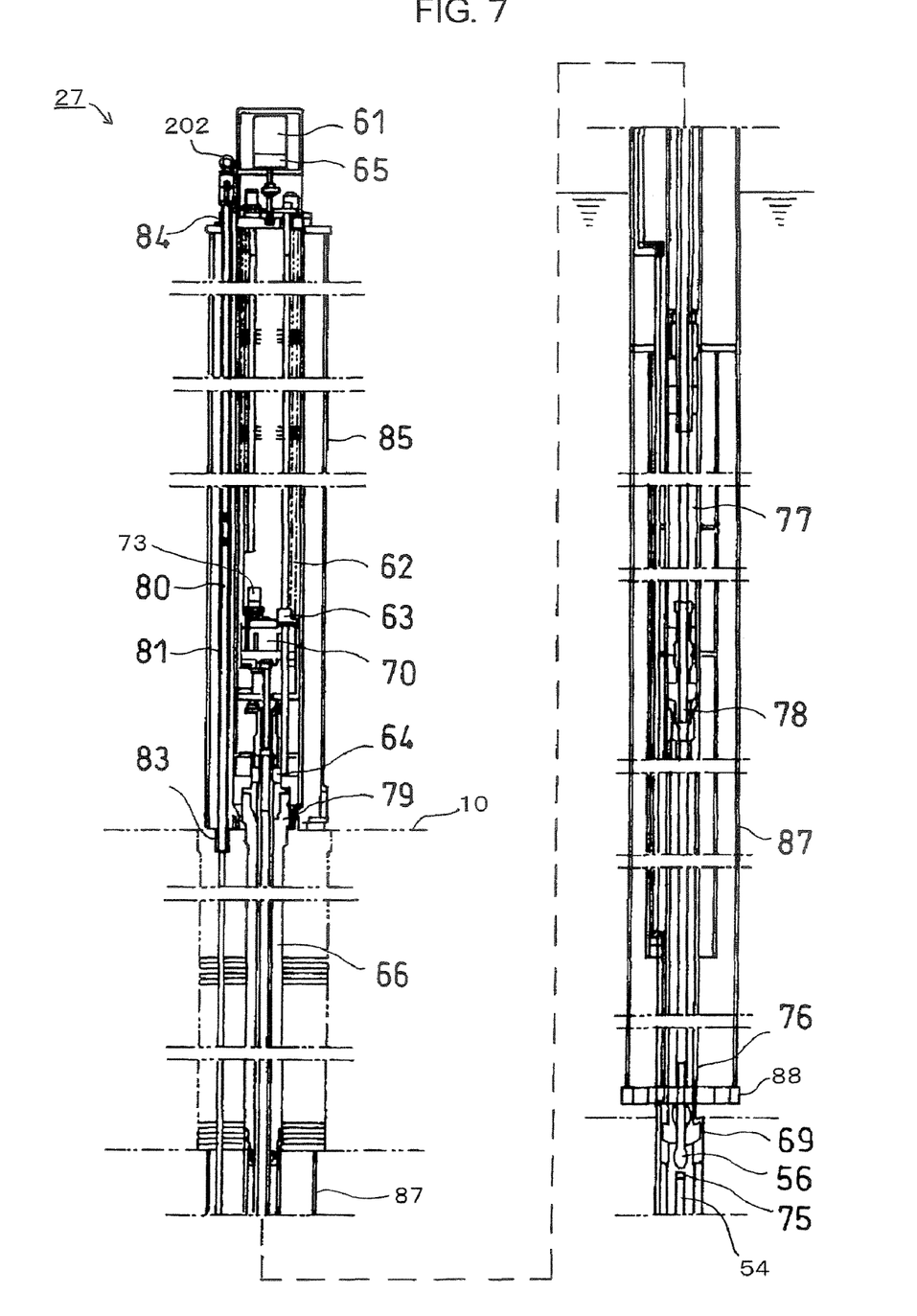
FIG. 7 is an enlarged schematic longitudinal cross sectional view of a lower part of the reactor shutdown rod drive mechanism of a third embodiment of fast reactor of the present invention, showing the configuration thereof.

As shown in FIG. 7, in the fast reactor 1 of this embodiment, the protection barrel 87 that covers the upper guide tube 66 of the reactor shutdown rod drive mechanism and the neutron absorbers 52 are provided at the lower end thereof with a rectifier plate 88 that operates as flow channel for coolant from the reactor core and secures a gap in order to accommodate the swell and expansion of the fuel assemblies 37 above the top level of the reactor core 2 so as to minimize the upward movement of the fuel assemblies 37 that can be produced by an earthquake.

When an earthquake occurs, both horizontal shakes and vertical shakes take place. As for vertical shakes, when the response acceleration at the reactor core exceeds 1 G, the fuel assemblies 37 are subjected to upward force greater than its own weight so that they are pushed upward from a predetermined level. The reactivity control will be gravely influenced if the displacement of the fuel assemblies 37 relative to the reflector 4 and the reactor shutdown rod 51 becomes significant.

The rectifier plate 88 at the lower end of the protection barrel 87 is so sized that the corners of the reactor core of the outermost layer can be projected on it. The protection barrel 87 is made to have a large thickness and an enhanced rigidity so that it can withstand the collision with the moving up fuel assemblies 37.

Thus, as described above, the third embodiment of the present invention can prevent the reactor core 2 from moving up when an earthquake takes place to make itself a highly reliable fast reactor.

Fourth Embodiment

Now, the fourth embodiment of the present invention will be described by referring to FIGS. 8 and 9. The components of the fourth embodiment that are the same or similar to those of the first embodiment are denoted respectively by the same reference symbols and will not be described in detail any further.

Figure 8:
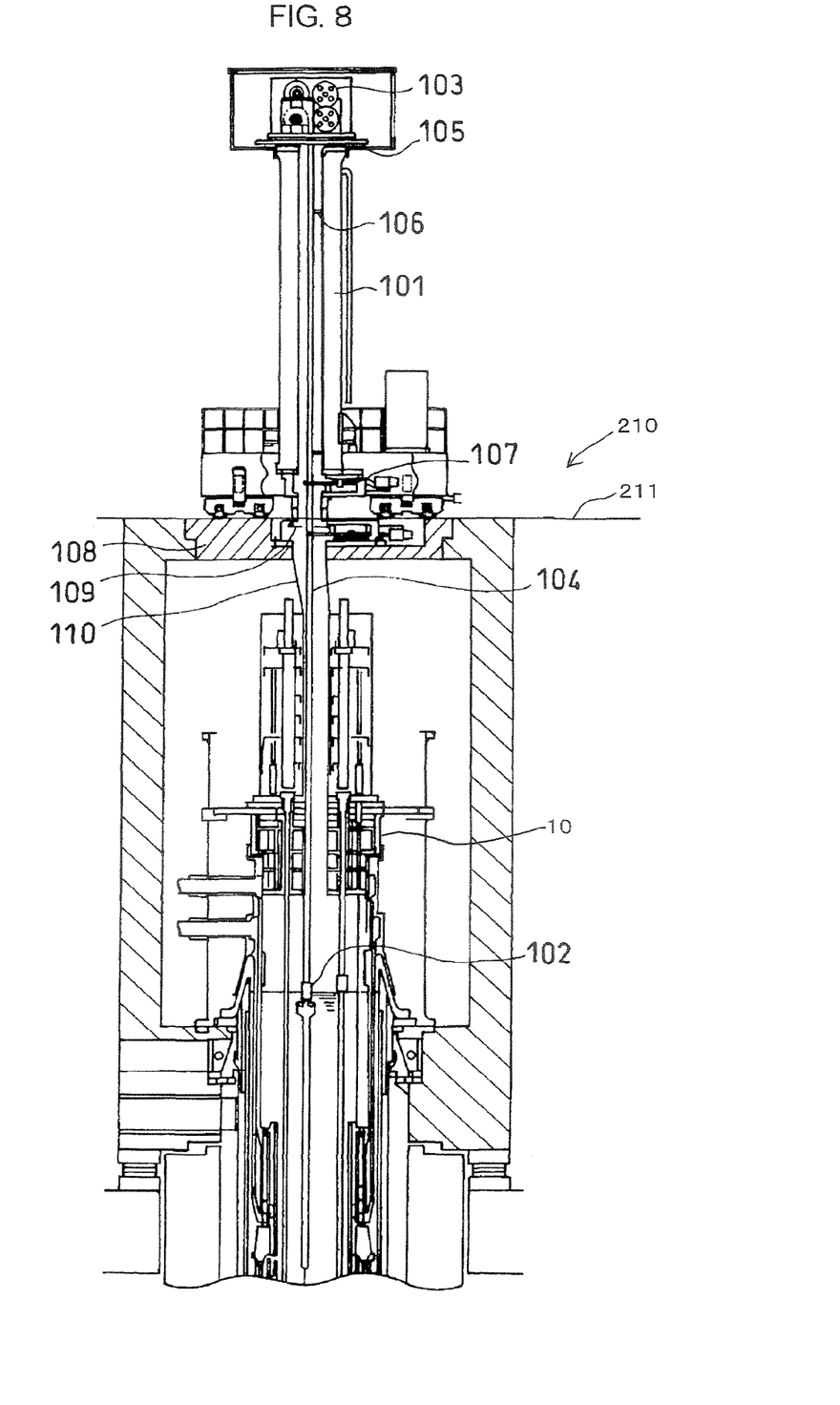
FIG. 8 is an enlarged schematic longitudinal cross sectional view of the fuel loading/unloading equipment of a fourth embodiment of fact reactor of the present invention.
Figure 9:
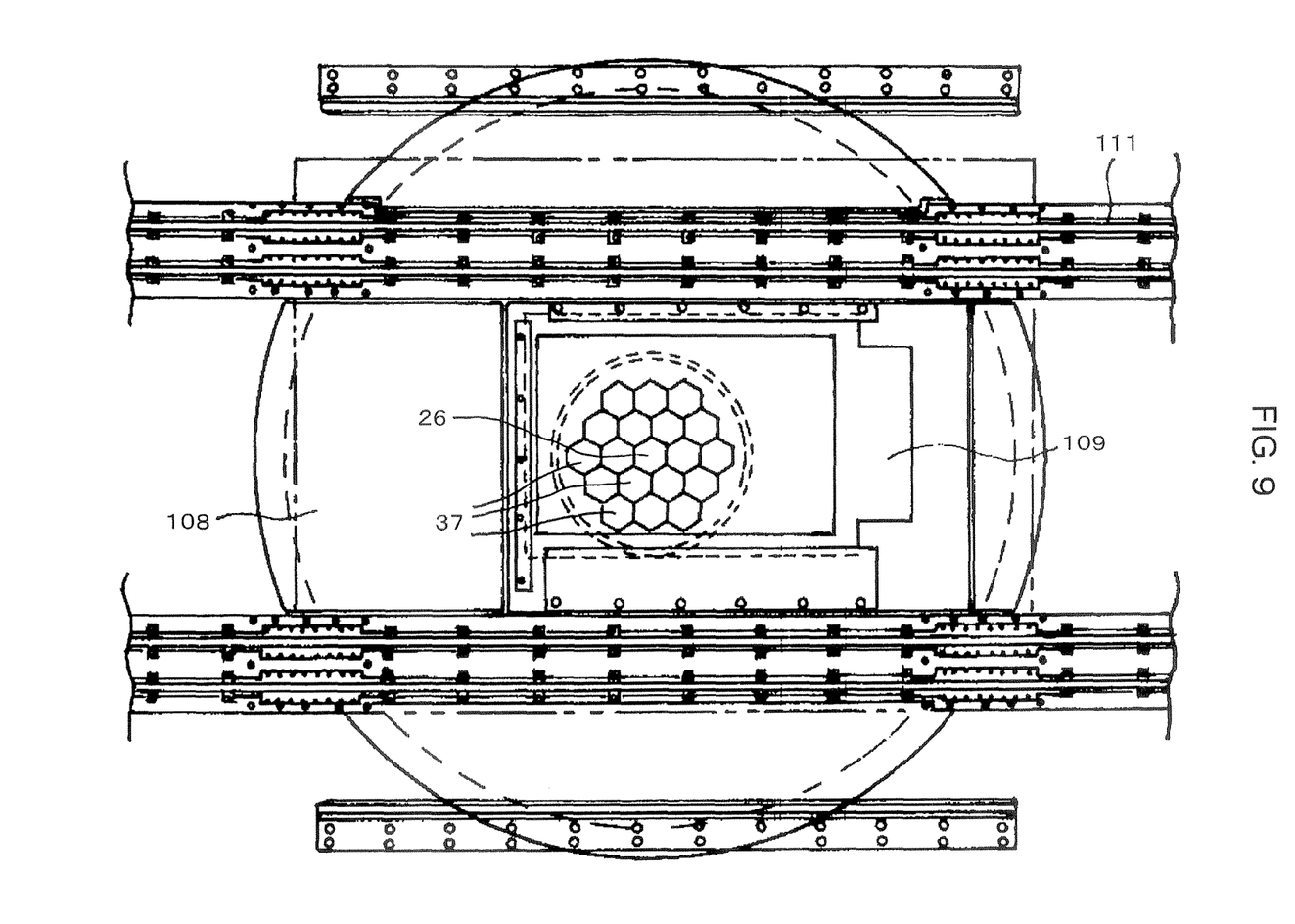
FIG. 9 is a schematic plan view of a fuel loading/unloading condition of the fast reactor of FIG. 8.

As shown in FIGS. 8 and 9, the fast reactor 1 of this embodiment needs to be provided at the upper plug 10 with an opening to be used for replacing the fuel assemblies 37 when the first criticality is observed. However, it is not possible to provide a dedicated opening because so many devices are arranged there in a congested manner. Therefore, a fuel loading/unloading machine 101 is arranged at the opening that appears when the reactivity control assembly drive mechanism 27 is removed for the purpose of replacing the fuel assemblies 37 in the nuclear reactor, handling the fuel assemblies 37 in and out of the nuclear reactor and transferring them to and from a fuel receiving/sending out facility.

The fuel loading/unloading machine 101 is adapted to run on rails arranged on the ceiling 211 of a reactor building 210. A winching mechanism 103 is arranged on top of the fuel loading/unloading machine 101 for operations including moving up and down the gripper 102 for handling fuel assemblies 37 and grasping/releasing the fuel assemblies 37. The winching mechanism 103 and the gripper 102 are linked to each other by way of two pairs of (or four) flexible members 104. The flexible members 104 may typically be tapes or chains made of stainless steel or some other anti-corrosion material.

A base 105 of the winching mechanism 105 is a structure that can be moved horizontally in two directions or in X and Y directions. If the fuel loading/unloading machine 101 is made to cover the entire reactor core 2, the bore diameter of the door valve 107 will have to be more than twice of the diameter of the reactor core 2. To avoid such a situation, the bore diameter of the door value 107 of the fuel loading/unloading machine 101 is minimized and the base 105 of the winching mechanism 103 is adapted to be driven in the X and Y directions to cover partial eccentric movements.

A support mechanism (support table) 106 is arranged in the main body of the fuel loading/unloading machine 101 for temporarily storing new fuel assemblies 37 in order to reduce the time required to replace the fuel assemblies 37. With this arrangement, it is possible to replace the spent fuel assemblies 37 with new fuel assemblies 37 in the main body of the fuel loading/unloading machine 101 without being required to go back to the pit floor facility of the fuel handling system after taking out the spent fuel assemblies 37 and mount the new fuel assemblies 37 in the reactor. A move in the X and Y directions is used for an eccentric operation of the gripper 102. The main body of the fuel loading/unloading machine 101 is equipped at a lower part thereof with a floor door valve 109 for a hermetical sealing effect.

The floor door valve 109 is arranged in the hermetically sealed barrel 110 and the reactor pit plug 108 to cover the opening of the reactor that appears when the reactivity control assembly drive mechanism 27 is removed in order to shut off the atmosphere when replacing the fuel assemblies 37. The floor door valve 109 can be arranged in a predetermined direction by turning the reactor pit plug 108 and the fuel assemblies 37 of the entire reactor core 2 can be handled by using the plurality of rails 111.

Thus, as described above, with the fourth embodiment of the present invention, it is possible to handle the fuel assemblies 37 with ease by means of a single fuel loading/unloading machine 101 without requiring a fuel exchanging machine, utilizing the opening that appears when the reactivity control assembly drive mechanism 27 is removed to a great advantage of reducing the total volume and realize a compact reactor structure.

What is claimed is:

1. A fast reactor comprising:
a plurality of fuel assemblies forming a reactor core;
a reactivity control assembly including a reactor shutdown rod of a backup reactor shutdown system and sectional neutron absorbers disposed around the reactor shutdown rod to suppress initial surplus reactivity, the reactor shutdown rod and the neutron absorbers being arranged in a hexagonal barrel-shaped wrapper tube at the center of the reactor core;
a core barrel surrounding outer periphery of the reactor core;
a reflector surrounding the outer periphery of the core barrel and adapted to move up and down;
a bulkhead surrounding outer periphery of the reflector and forming an inner wall of a coolant flow channel of primary coolant;
an upper support plate supporting the core barrel and the bulkhead;
an intermediate heat exchanger arranged in an annular space above the upper support plate;
an electromagnetic pump arranged below the intermediate heat exchanger;
a reactor vessel containing the fuel assemblies, the reactivity control assembly, the reflector, the bulkhead, the intermediate heat exchanger and the electromagnetic pump and including an upper opening;
an upper plug plugging the upper opening of the reactor vessel;
a reactor shutdown rod drive mechanism for causing an inner extension tube to fall and to release the reactor shutdown rod by a gripper section that includes latch fingers, at a lowermost end of an outer extension tube by turning off power supply to a holding magnet at a time of scram; and
a plurality of units of neutron absorber drive mechanism, each including a dual tube drive shaft including an outer extension shaft and an inner extension shaft, the outer extension shaft being adapted to be pulled up to allow both of the inner and outer extension shafts to be inserted and pushed down after getting to a handling head section of the neutron absorber so as to grasp the neutron absorber externally by the latch fingers of the gripper section and hang up entirely with the drive shaft to individually move the neutron absorber up and down, wherein the reactor shutdown rod drive mechanism and the neutron absorber drive mechanism are integrally formed and arranged at a center of the upper plug,
wherein:
the reactor shutdown rod has a cylindrical profile and a head is formed at the top of the reactor shutdown rod;
the reactivity control assembly includes a cylindrical guide tube arranged in the wrapper tube to surround the reactor shutdown rod and the plurality of sectional neutron absorbers arranged peripherally between the guide tube and the wrapper tube, and
a cylindrical neutron absorber handling rod is arranged so as to project from a top of the reactivity control assembly when the neutron absorber moves to a lowest position, a neutron absorber handling head being formed at a top of the neutron absorber handling rod.

2. A fast reactor comprising:
a plurality of fuel assemblies forming a reactor core;
a reactivity control assembly including a reactor shutdown rod of a backup reactor shutdown system and sectional neutron absorbers disposed around the reactor shutdown rod to suppress initial surplus reactivity, the reactor shutdown rod and the neutron absorbers being arranged in a hexagonal barrel-shaped wrapper tube at the center of the reactor core;
a core barrel surrounding outer periphery of the reactor core;
a reflector surrounding the outer periphery of the core barrel and adapted to move up and down;
a bulkhead surrounding outer periphery of the reflector and forming an inner wall of a coolant flow channel of primary coolant;
an upper support plate supporting the core barrel and the bulkhead;
an intermediate heat exchanger arranged in an annular space above the upper support plate;
an electromagnetic pump arranged below the intermediate heat exchanger;
a reactor vessel containing the fuel assemblies, the reactivity control assembly, the reflector, the bulkhead, the intermediate heat exchanger and the electromagnetic pump and including an upper opening;
an upper plug plugging the upper opening of the reactor vessel;
a reactor shutdown rod drive mechanism for causing an inner extension tube to fall and to release the reactor shutdown rod by a gripper section that includes latch fingers, at a lowermost end of an outer extension tube by turning off power supply to a holding magnet at a time of scram; and
a plurality of units of neutron absorber drive mechanism, each including a dual tube drive shaft including an outer extension shaft and an inner extension shaft, the outer extension shaft being adapted to be pulled up to allow both of the inner and outer extension shafts to be inserted and pushed down after getting to a handling head section of the neutron absorber so as to grasp the neutron absorber externally by the latch fingers of the gripper section and hang up entirely with the drive shaft to individually move the neutron absorber up and down, wherein the reactor shutdown rod drive mechanism and the neutron absorber drive mechanism are integrally formed and arranged at a center of the upper plug, wherein:

the reactor shutdown rod drive mechanism includes:

a latch link for opening the holding magnet when the holding magnet is de-excited to release the inner extension tube, a rod vertically running through the holding magnet;

an armature arranged under the holding magnet in contact with the holding magnet, and a backup de-latch drive motor for forcibly releasing the armature from the holding magnet by pushing down the rod and by turn pushing down the armature by means of the rod.

3. A fast reactor comprising:

a plurality of fuel assemblies forming a reactor core;

a reactivity control assembly including a reactor shutdown rod of a backup reactor shutdown system and sectional neutron absorbers disposed around the reactor shutdown rod to suppress initial surplus reactivity, the reactor shutdown rod and the neutron absorbers being arranged in a hexagonal barrel-shaped wrapper tube at the center of the reactor core;

a core barrel surrounding outer periphery of the reactor core;

a reflector surrounding the outer periphery of the core barrel and adapted to move up and down;

a bulkhead surrounding outer periphery of the reflector and forming an inner wall of a coolant flow channel of primary coolant;

an upper support plate supporting the core barrel and the bulkhead;

an intermediate heat exchanger arranged in an annular space above the upper support plate;

an electromagnetic pump arranged below the intermediate heat exchanger;

a reactor vessel containing the fuel assemblies, the reactivity control assembly, the reflector, the bulkhead, the intermediate heat exchanger and the electromagnetic pump and including an upper opening;

an upper plug plugging the upper opening of the reactor vessel;

a reactor shutdown rod drive mechanism for causing an inner extension tube to fall and to release the reactor shutdown rod by a gripper section that includes latch fingers, at a lowermost end of an outer extension tube by turning off power supply to a holding magnet at a time of scram; and a plurality of units of neutron absorber drive mechanism, each including a dual tube drive shaft including an outer extension shaft and an inner extension shaft, the outer extension shaft being adapted to be pulled up to allow both of the inner and outer extension shafts to be inserted and pushed down after getting to a handling head section of the neutron absorber so as to grasp the neutron absorber externally by the latch fingers of the gripper section and hang up entirely with the drive shaft to individually move the neutron absorber up and down, wherein the reactor shutdown rod drive mechanism and the neutron absorber drive mechanism are integrally formed and arranged at a center of the upper plug, wherein:

the units of the neutron absorber drive mechanism are arranged around the reactor shutdown rod drive mechanism at regular intervals;

the drive shaft of each of the units of the neutron absorber drive mechanism has a dual tube structure having the outer extension shaft and the inner extension shaft offset midway relative to each other, the gripper section being arranged at a bottom end of the inner extension shaft to externally grasp the handling head of the neutron absorber, a drive shaft supporting stopper being arranged at a top end of the inner extension shaft; and an entire outer housing has a sealed structure in addition to the cover gas seal section arranged on the upper surface of the upper plug.

4. The fast reactor according to claim 1, wherein the reactor shutdown rod drive mechanism includes: an extension tube latch mechanism for hanging up an upper part of the outer extension tube; and a power cylinder arranged in the extension tube latch mechanism for pushing up only the outer extension tube; wherein the latch finger grasping the reactor shutdown rod handling head is closed to allow the reactor shutdown rod to make a freefall when the outer extension tube is pushed up by the power cylinder.

5. The fast reactor according to claim 1, wherein a large rectifier plate is arranged at a lower end of a protection barrel to allow entire reactor core to be projected on it.

6. The fast reactor according to claim 1, further comprising:

a fuel loading/unloading machine inserted into an opening of the upper plug produced when the reactivity control assembly drive mechanism is removed; wherein the fuel loading/unloading machine includes:

a winching mechanism supported on a base arranged above the opening of the upper plug so as to be capable of horizontally moving in mutually orthogonal two directions; and a support mechanism for temporarily storing the fuel assembly hung up by the winching mechanism.

7. The fast reactor according to claim 1, further comprising:

fuel loading/unloading rails of at least two routes arranged on a ceiling of a reactor building containing the reactor vessel to support the fuel loading/unloading machine, allowing the fuel loading/unloading machine to move in horizontal directions;

a reactor pit plug arranged above the upper plug at the height of the ceiling of the reactor building; and a floor door valve capable of rotating around a vertical axis relative to the reactor pit plug and capable of opening, wherein the winching mechanism being arranged above an opening of the floor door valve so as to be able to move to right above all of the plurality of fuel assemblies in the reactor core.

8. The fast reactor according to claim 2, wherein the reactor shutdown rod drive mechanism includes: an extension tube latch mechanism for hanging up an upper part of the outer extension tube; and a power cylinder arranged in the extension tube latch mechanism for pushing up only the outer extension tube; wherein the latch finger grasping the reactor shutdown rod handling head is closed to allow the reactor shutdown rod to make a freefall when the outer extension tube is pushed up by the power cylinder.

9. The fast reactor according to claim 2, wherein
a large rectifier plate is arranged at a lower end of a protection barrel to allow entire reactor core to be projected on it.

10. The fast reactor according to claim 2, further comprising:
a fuel loading/unloading machine inserted into an opening of the upper plug produced when the reactivity control assembly drive mechanism is removed; wherein
the fuel loading/unloading machine includes:
a winching mechanism supported on a base arranged above the opening of the upper plug so as to be capable of horizontally moving in mutually orthogonal two directions; and
a support mechanism for temporarily storing the fuel assembly hung up by the winching mechanism.

11. The fast reactor according to claim 2, further comprising:
fuel loading/unloading rails of at least two routes arranged on a ceiling of a reactor building containing the reactor vessel to support the fuel loading/unloading machine, allowing the fuel loading/unloading machine to move in horizontal directions;
a reactor pit plug arranged above the upper plug at the height of the ceiling of the reactor building; and
a floor door valve capable of rotating around a vertical axis relative to the reactor pit plug and capable of opening, wherein
the winching mechanism being arranged above an opening of the floor door valve so as to be able to move to right above all of the plurality of fuel assemblies in the reactor core.

12. The fast reactor according to claim 3, wherein
the reactor shutdown rod drive mechanism includes: an extension tube latch mechanism for hanging up an upper part of the outer extension tube; and
a power cylinder arranged in the extension tube latch mechanism for pushing up only the outer extension tube; wherein
the latch finger grasping the reactor shutdown rod handling head is closed to allow the reactor shutdown rod to make a freefall when the outer extension tube is pushed up by the power cylinder.

13. The fast reactor according to claim 3, wherein
a large rectifier plate is arranged at a lower end of a protection barrel to allow entire reactor core to be projected on it.

14. The fast reactor according to claim 3, further comprising:
a fuel loading/unloading machine inserted into an opening of the upper plug produced when the reactivity control assembly drive mechanism is removed; wherein
the fuel loading/unloading machine includes:
a winching mechanism supported on a base arranged above the opening of the upper plug so as to be capable of horizontally moving in mutually orthogonal two directions; and
a support mechanism for temporarily storing the fuel assembly hung up by the winching mechanism.

15. The fast reactor according to claim 3, further comprising:
fuel loading/unloading rails of at least two routes arranged on a ceiling of a reactor building containing the reactor vessel to support the fuel loading/unloading machine, allowing the fuel loading/unloading machine to move in horizontal directions;
a reactor pit plug arranged above the upper plug at the height of the ceiling of the reactor building; and
a floor door valve capable of rotating around a vertical axis relative to the reactor pit plug and capable of opening, wherein
the winching mechanism being arranged above an opening of the floor door valve so as to be able to move to right above all of the plurality of fuel assemblies in the reactor core.

* * * * *